United States Patent
Zhan et al.

(10) Patent No.: US 11,231,079 B2
(45) Date of Patent: Jan. 25, 2022

(54) FERROUS WORKPIECE AND METHOD OF MANUFACTURE

(71) Applicant: GM Global Technology Operations LLC, Detroit, MI (US)

(72) Inventors: Henry Zhan, Shanghai (CN); Jianfeng Wang, Nanjing (CN); Michael L. Holly, St. Clair Shores, MI (US); Mark T. Riefe, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 16/509,015

(22) Filed: Jul. 11, 2019

(65) Prior Publication Data
US 2020/0072305 A1   Mar. 5, 2020

(30) Foreign Application Priority Data
Sep. 3, 2018  (CN) .......................... 201811020238.5

(51) Int. Cl.
  *F16D 65/10* (2006.01)
  *B60T 1/06* (2006.01)
  *F16D 65/12* (2006.01)

(52) U.S. Cl.
  CPC .............. *F16D 65/10* (2013.01); *B60T 1/065* (2013.01); *F16D 65/125* (2013.01); *F16D 65/127* (2013.01); *F16D 2200/0013* (2013.01); *F16D 2200/0017* (2013.01); *F16D 2250/0053* (2013.01)

(58) Field of Classification Search
CPC .. B23B 5/02; B60T 1/065; C21D 5/00; C23C 8/04; C23C 8/30; F16D 65/10
USPC .......... 188/218 XL; 29/90.01; 148/219, 225, 148/230, 287
See application file for complete search history.

(56) References Cited

U.S. PATENT DOCUMENTS 5,664,648 A * 9/1997 Hester ................. C21D 7/04
                                                         188/218 R
5,826,453 A * 10/1998 Prevey, III .............. B24B 39/00
                                                         72/75

(Continued)

FOREIGN PATENT DOCUMENTS

CN    102031481 A    4/2011
DE    19753116 C1    7/1999

(Continued)

*Primary Examiner* — Christopher P Schwartz
(74) *Attorney, Agent, or Firm* — Vivacqua Crane PLLC

(57) ABSTRACT

A method for manufacturing a ferrous rotational member including the steps of turning a first portion of the friction surface at a sufficient feed rate to provide a first deformed layer on the first portion of the friction surface; fine turning a second portion of the friction surface at a sufficient feed rate to provide a second deformed layer on the second portion of the friction surface; burnishing the first and second portions of the friction surface to achieve a predetermined roughness; and nitrocarburizing the rotational member at a time and temperature sufficient for the diffusion of nitrogen atoms and carbon atoms through the deformed layer to form hardened casings having variable thickness. The ferrous rotational member may be that of a brake rotor having a hub surface and a friction surface, where the hub surface and friction surface have a variable thickness hardened casing.

11 Claims, 6 Drawing Sheets

(56) References Cited

U.S. PATENT DOCUMENTS

| | | | | |
|---|---|---|---|---|
| 6,186,293 B1* | 2/2001 | Beer | ............... | F16D 65/127 |
| | | | | 188/218 XL |
| 9,541,144 B2* | 1/2017 | Sugai | ............... | C23C 8/30 |
| 2014/0143992 A1* | 5/2014 | Xiong | ............... | C23C 8/04 |
| | | | | 29/90.01 |
| 2014/0149053 A1* | 5/2014 | Sun | ............... | B24B 39/045 |
| | | | | 702/33 |
| 2015/0292053 A1* | 10/2015 | Xiong | ............... | C21D 5/00 |
| | | | | 148/219 |

FOREIGN PATENT DOCUMENTS

| | | |
|---|---|---|
| DE | 102007027933 A1 | 1/2008 |
| DE | 102010047307 A1 | 5/2011 |
| DE | 112012007182 T5 | 8/2015 |
| WO | 2018036858 A1 | 3/2018 |

\* cited by examiner

FERROUS WORKPIECE AND METHOD OF MANUFACTURE

INTRODUCTION

The present disclosure generally relates to ferrous workpieces and methods of manufacturing, and more specifically, to a cast-iron rotational member of a brake assembly and method of manufacturing the rotational member.

Ferrous materials are used in applications where resistance to surface wear from friction is desirable. In the automotive applications, cast-iron is used in the manufacture of rotational members, such as for brake rotors and brake drums, for a brake assembly. A typical brake assembly includes brake pads or brake shoes having a friction material that engage the friction surface of the brake rotor or brake drums, respectively, to retard the rotational movement of the rotational member, and hence retarding the velocity of the vehicle.

As the friction material is engaged to the friction surface of the rotational member, mechanical wear and heat cause small amounts of both the friction material and friction surface of the rotational member to wear away. The rate of wear of the friction surface may be reduced by reducing the coefficient of friction between the friction surface and the friction material, but a lower coefficient of friction may make the brakes less effective at retarding the velocity of the vehicle. Furthermore, the rotational member is exposed to the harsh external operating environment of the motor vehicle. The ferrous substrate of the rotational member, more specifically to the friction surface which is subject to continuous wear, forms iron oxides from the exposure of water, salts, and other corrosive substances typically found in the harsh operating environment of the vehicle. Iron oxides are porous, fragile and easy to scale off, thus leading to accelerated wear of the friction surface.

In the effort to enhance the durability of cast iron parts with friction surfaces having high wear cycles and excellent corrosion resistance, engineers continue to develop materials and manufacturing processes to identify which microstructure features play the most significant role in improving these characteristics and improve upon those material properties. A method of burnishing the friction surface by rubbing the surface against a blunt tool to form a nanocrystallized surface layer and then diffusing nitrogen atoms and carbon atoms through the nanocrystallized surface layer by a nitrocarburizing process to form a wear resistance and corrosion-resistance friction surface is disclosed in U.S. Patent Application No.: PCT/CN2012/085510 (herein PCT '510).

The method of burnishing the friction surface by a blunt instrument as disclosed in PCT '510 provides a nanocrystallized structure for facilitating the diffusion of nitrogen atoms and carbon atoms therethrough to provide a hardened casing. The thickness of the nanocrystallized structure may be increased, thus providing a more desirable hardened casing thickness after nitrocarburizing, by applying a greater force during the burnishing process. However, excessive force may lead to undesirable results such as damage to the friction surface resulting in undesirable surface roughness (Ra) to the friction surface of greater than 3 microns.

Thus, while the method of burnishing and nitrocarburizing the rotational member to increase the wear and corrosion resistance of the friction surface achieve their intended purpose, there is a need for a method to further provide a thicker hardened casing to increase the wear and corrosion resistance of the friction surface while providing a good surface quality having a desirable roughness (Ra) of 3 microns or less.

SUMMARY

According to several aspects, a ferrous brake rotor having a hub portion and an annular disk portion extending from hub portion is disclosed. The annular disk portion includes a first segment friction surface having a hardened casing with a hardened casing thickness. The hub portion includes a hub surface having a hardened casing with a hardened casing thickness. The hardened casing thickness of the first segment friction surface is greater than the hardened casing thickness of the hub surface.

In an additional aspect of the present disclosure, the ferrous brake rotor further includes a second segment friction surface having a hardened casing adjacent the first segment friction surface of the disk portion. The hardened casing thickness of the first segment friction surface is greater than the hardened casing thickness of the second segment friction surface.

In another aspect of the present disclosure, the first segment friction surface and second segment friction surface includes a roughness of less than about 3 μm.

In another aspect of the present disclosure, the first segment friction surface is flush with and interspersed between a pair of second segment friction surfaces.

In another aspect of the present disclosure, the first segment friction surface and the hub surface includes a hardness of 50 to 90 HRC.

In another aspect of the present disclosure, the hardened casing thickness of the first segment friction surface is about 1.1 to 2 times the hardened casing thickness of the hub surface.

In another aspect of the present disclosure, the hardened casing thickness of the first segment friction surface a porous layer and a non-porous layer.

In another aspect of the present disclosure, the porous layer has a thickness of approximately 10% of the total thickness of the non-porous layer and the porous layer.

According to several aspects, a method for manufacturing a ferrous brake member having a friction surface is disclosed. The method includes turning a first portion of the friction surface at a sufficient feed rate and cutting depth to provide a first deformed layer having a nanocrystallized microstructure. Turning the first portion of the friction surface includes rotating the ferrous member about a rotational axis at a rate of 400 to 1000 revolution per minute (RPM) and removing a layer of material from the surface of the first portion of the friction surface, with a cutting tool, at a feed rate of 0.25 to 1.00 mm per revolution and a cut-depth of 0.2 to 0.8 mm. Then burnishing the first portion of the friction surface to achieve a predetermined first roughness. Then nitrocarburizing the ferrous member at a time and temperature sufficient for the diffusion of nitrogen atoms and carbon atoms through the nanocrystallized microstructure layers.

In another aspect of the present disclosure, the method further includes turning a second portion of the friction surface at a sufficient feed rate to provide a second deformed layer on the second portion of the friction surface, where the second deformed layer includes a nanocrystallized microstructure layer thinner than the nanocrystallized microstructure layer of the first portion of the friction surface. Burnishing the second portion of the friction surface to achieve a predetermined second roughness. The first and second portion of the friction surface is burnished with an applied burnishing pressure of 5 Mega-Pascal (MPa) to 25 MPa.

According to several aspects, a method for manufacturing a ferrous rotational member having a friction surface is disclosed. The method includes turning a first portion of the friction surface at a sufficient feed rate and cut depth to provide a first deformed layer having a nanocrystallized microstructure on the first portion of the friction surface. Burnishing the first portion of the friction surface, after the turning, with a blunt tool to achieve a predetermined roughness. Then nitrocarburizing the rotational member at a time and temperature sufficient for the diffusion of nitrogen atoms and carbon atoms through the nanocrystallized microstructure layer to form a hardened casing (c1) having a thickness (t1).

In an additional aspect of the present disclosure, the step of turning the first portion of the friction surface includes rotating the fiction surface about a rotational axis at a rate of 400 to 1000 revolution per minute (RPM) and removing a layer of material, with a cutting tool, from the first portion of the friction surface at a rate of 0.25 to 1.00 mm per revolution and a cutting depth of 0.2 to 0.8 mm.

In another aspect of the present disclosure, the step of turning the first portion of the friction surface includes cutting a plurality of 3 to 8 micrometer deep grooves.

In another aspect of the present disclosure, the step of turning the first portion of the friction surface includes adjusting the RPM of the friction surface about the rotational axis such that the linear speed of the friction surface relative to the cutting tool is 200 to 2000 meters per minute.

In another aspect of the present disclosure, the step of turning the first portion of the friction surface includes generating a surface roughness (Ra) of 3 to 8 μm.

In another aspect of the present disclosure, burnishing a second portion of the friction surface to a roughness of less than 3 μm and a nanocrystallized microstructure layer. The step of nitrocarburizing the rotational member nitrocarburizing the rotational member diffuses a sufficient amount of nitrogen atoms and carbon atoms through the nanocrystallized microstructure layer of the second portion of the friction surface to form a hardened casing (c2) having thickness (t2).

In another aspect of the present disclosure, the thickness (t1) of the hardened casing (c1) is greater than the thickness (t2) of the hardened casing (c2).

In another aspect of the present disclosure, steps of burnishing the first and second portions of the friction surface includes applying a burnishing pressure of 5 Mega-Pascal (MPa) to 25 MPa.

In another aspect of the present disclosure, the rotational member is a brake rotor having a hub surface, and the step of nitrocarburizing the rotational member includes diffusing a sufficient amount of nitrogen atoms and carbon atoms to form a third hardened casing on the hub surface, wherein the third hardened casing includes a third thickness less than the thickness (t2) of the second portion of the friction surface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

The present disclosure provides a method for manufacturing a ferrous workpiece, such as a cast iron rotational member of a vehicle brake assembly. In the examples disclosed herein, a surface of the ferrous workpiece is first selectively machined and then pre-conditioned to form a layer of nanocrystallized microstructure on the surface. The ferrous workpiece is then subjected to ferritic nitrocarburizing (FNC) treatment where the nanocrystallized microstructure layer accelerates and facilitates the diffusion of nitrogen atoms and carbon atoms therethrough to provide a hardened layer, also known as a hardened casing. The hardened casing may include multiple segments having multiple thicknesses. It was surprisingly found that the combination of machining and pre-conditioning of the surface was able to provide a thicker layer of nanocrystallized microstructure without causing damage to the surface that would result in desirable roughness (Ra) as compared to machining or pre-conditioning alone.

As used herein, the term "friction surface" refers to the functional surface of the ferrous workpiece that engages a friction material, such as brake pads, in operation. As used herein, the term "finished surface" refers to the surface of the ferrous workpiece that has been exposed to a machining operation, such as turning. Also as used herein, the term "nanocrystallized microstructure" refers to the refined microstructure with nano-sized grains (e.g., from about 5 nm to 2000 nm) at or near the finished surface.

Figure 1:
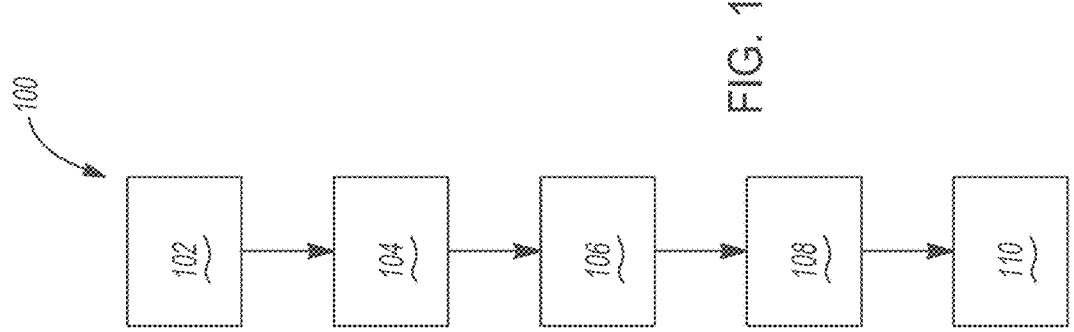
FIG. 1 is a flow chart depicting the steps of a method according to the principles of the present disclosure.

Referring first to FIG. 1, is a method 100 of manufacturing the ferrous workpiece. The example shown in FIG. 1 include a first step 102 of casting a ferrous (e.g., grey ferrous, nodular ferrous, etc.) workpiece followed by a second optional step 104 of stress relieving the ferrous workpiece. A third step 106 includes machining the workpiece to achieve a predetermined configuration and dimensions. The ferrous workpiece may be that of any cast iron component having a functional surface that can be rotated about an axial symmetry during a turning operation. The turning operation, or turning, is a machining process in which a cutting tool, typically a non-rotary tool bit, moves more or less linearly while the workpiece rotates about the axial symmetry. Examples of workpieces rotating about the axial symmetry include a shaft having an exterior cylindrical bearing surface and a rotational member of a brake assembly, such as a brake rotor or brake drum, having a friction surface.

Figure 2:
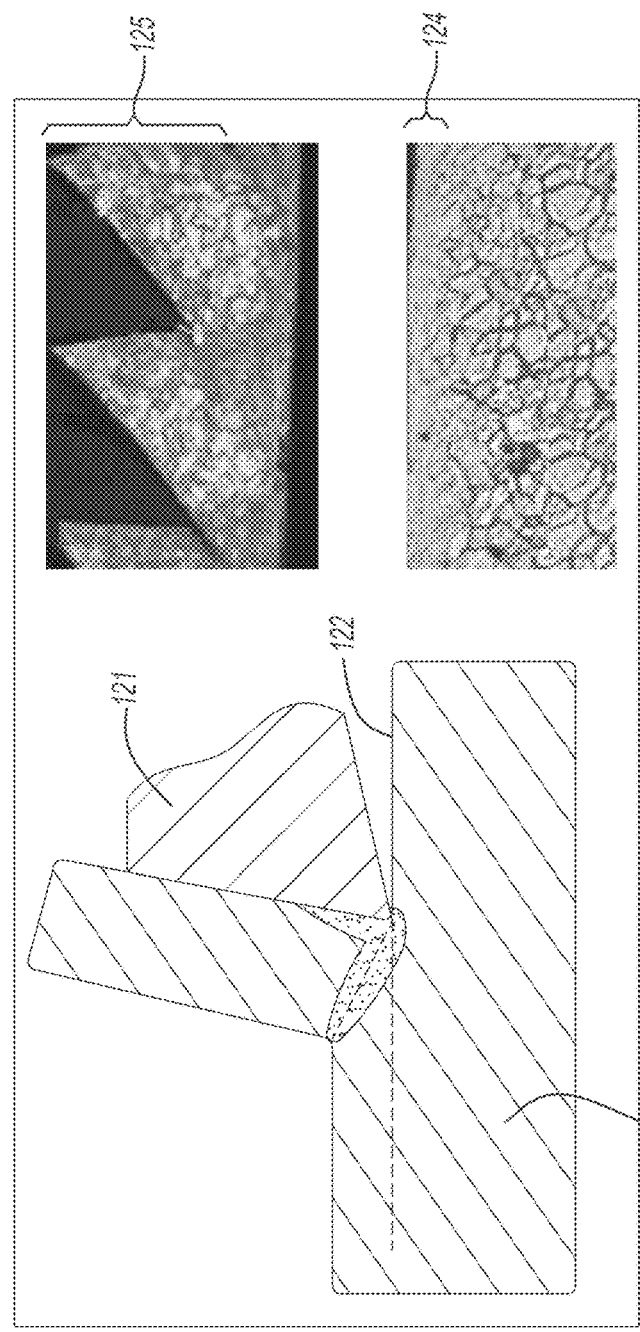
FIG. 2 is a depiction of a machining step of the method according to the principles of the present disclosure.

An example of the third step 106 is shown in FIG. 2, which displays a schematic of machining a ferrous workpiece 118 by a turning operation using a cutting tool 121. The turning operation provides a finished surface 122 of the workpiece 118 having a nano-layer 124 of severe deformation approximately 3 μm to 20 μm deep. A relatively deep cutting depth, generally indicated by reference number 125, from 0.2 mm to 0.8 mm. A relatively high feeding rate of 0.25 to 1.00 mm/Rev may be used to accomplish the third step 106. A rotation speed is set between 400 to 1000 rev/min or a linear speed of 200 m/min to 1000 m/min may be set. After the third step, the roughness (Ra) of the semi-finished surface is approximately 3 μm to 8 μm and the depth of nanocrystallized microstructures on the top of surface will be 3 μm to 20 μm.

Figure 4:
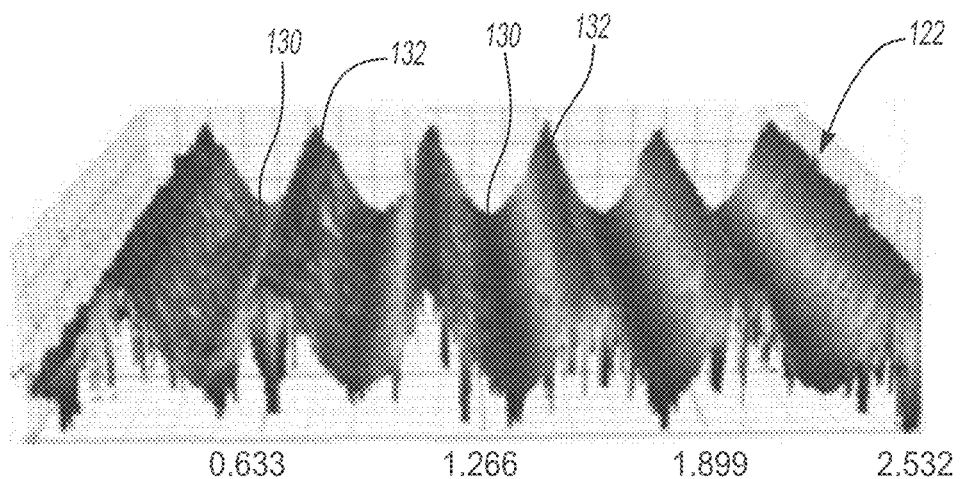
FIG. 4 is a depiction of a magnified view of a surface finish after one of the steps of the method according to the principles of the present disclosure.

Shown in FIG. 4 is an image of the micro-finish remaining on the surface 122 of the workpiece 118 after the third step 106 of machining the workpiece 118. The peaks 132 and valleys 130 of the surface 122 provides material to be plastically deformed in the next step, the fourth step 108. The turning operation promotes the nanocrystallization of the surface, resulting in the formation of the nanocrystallized microstructure. It is desirable that the thickness of nanocrystallized microstructure ranges from about 3 μm to about 20 μm, preferably about 8 μm. It is believed that the nanocrystallized microstructure is better prepared (e.g., compared to a surface that is not nanocrystallized) for FNC treatments.

The fourth step 108 includes plastically deforming the peaks 132 and valleys 130 of the surface 122 to form an overall thicker layer of nanocrystallized microstructure 128 at the surface. This is accomplished by burnishing the finished surface of the workpiece 118 by using a rolling to plastically deform the surface of the workpiece 118. The roller generally has a smooth surface, which is polished and has a surface roughness (Ra) less than 1 μm. In one example, the radius of the roller ranges from about 1 mm to about 200 mm. In another example, the radius of the roller ranges from about 5 mm to about 10 mm. Roller burnishing has a relatively short cycle time. In an example, the cycle time ranges from about 10 seconds to about 120 seconds per pass. Since burnishing is a type of non-material removal processing method, the thick refined microstructures generated by the turning operation can be maintained or even thickened by burnishing with an applied pressure of 5 Mega-pascal (MPa) to 25 MPa. The roller burnishing reduces the roughness Ra of the nanocrystallized microstructure from 3-6 μm to about 0.1-3.0 μm.

Figure 3:
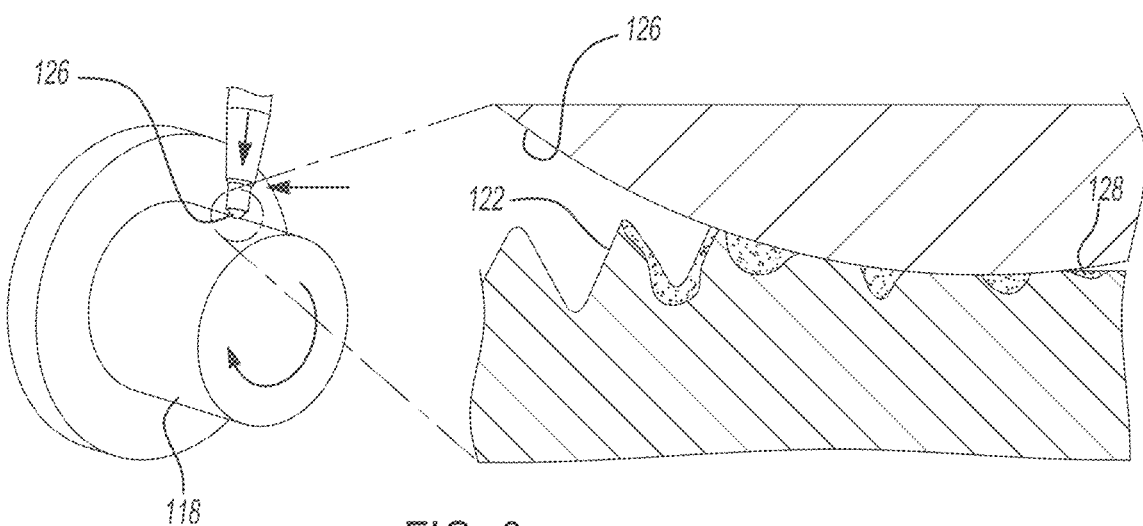
FIG. 3 is a depiction of a pre-conditioning step of the method according to the principles of the present disclosure.
Figure 5:
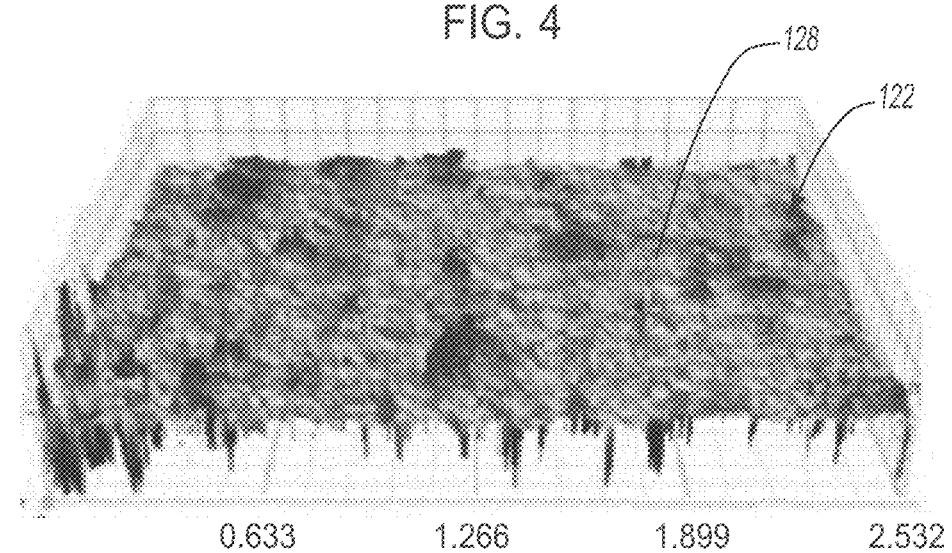
FIG. 5 is a depiction of a magnified view of a surface finish after another one of the steps of the method according to the principles of the present disclosure.

FIG. 3 is an illustration of the fourth step 108 showing an exemplary workpiece 118 being rotated and having a burnishing tool 126 applied to the cylindrical surface 122. This burnishing operation can be one cycle or several cycles. FIG. 5 is an image of the micro-finish remaining on the surface 122 of the workpiece 118 after the fourth step 108 of burnishing the workpiece 118. FIG. 5 shows the peaks 132 and valleys 130 having been plastically deformed by burnishing to form an even thicker nanocrystallized structure 128.

The burnishing tool may also be that of a blunt tool having the shape of a sphere, spherical-cap, roller, parabolic shape or any shape can be rotated against the workpiece, to improve the surface roughness and surface quality of the semi-finished surface. The further deformation of the finished surface against the blunt tool (i.e., nanocrystallization) is severe, plastic deformation local to the location of contact between the blunt tool and the workpiece. The deformation occurs substantially without forming chips and without removing material in the process of deformation. Furthermore, the local deformation of the finished surface is distinct from global deformation that would occur in wire drawing or sheet-metal rolling.

Although the deformation of the present disclosure occurs in the vicinity of the blunt tool, a large surface of a workpiece may be nanocrystallized by systematically applying the blunt tool to the entire surface. It is to be understood that more than one pass may be made over the finish surface with the blunt tool, where each pass may have a different pressure, feeding rate, and burnishing depth. It is to be further understood that a thicker layer of nanocrystallized microstructure 128 at the surface can be achieved by burnishing a surface that has undergone the turning operation as described above as compared to burnishing a surface that was not exposed to the turning operation.

The fifth step 110 of the method 100 includes nitrocarburizing for period of time ranging from about 1 hour to about 3 hours at a temperature ranging from about 550° C. to about 570° C. to diffuse nitrogen and carbon through the nanocrystallized microstructure. The combined third step 106 and the fourth step 108 of the instant method 100 enables the formation of a thicker layer of nanocrystallized microstructure on the finished surface without causing damage to the finished surface. This thicker layer of nanocrystallized microstructure enables a higher diffusion rate of nitrogen and carbon deeper into the ferrous workpiece, which leads to a considerably more efficient FNC process and thicker hardened casing. It should be noted that the time required at temperature for the fifth step 110 may vary based on the method of nitrocarburizing, workpiece composition and design, and nitrogen and carbon potentials.

Figure 6:
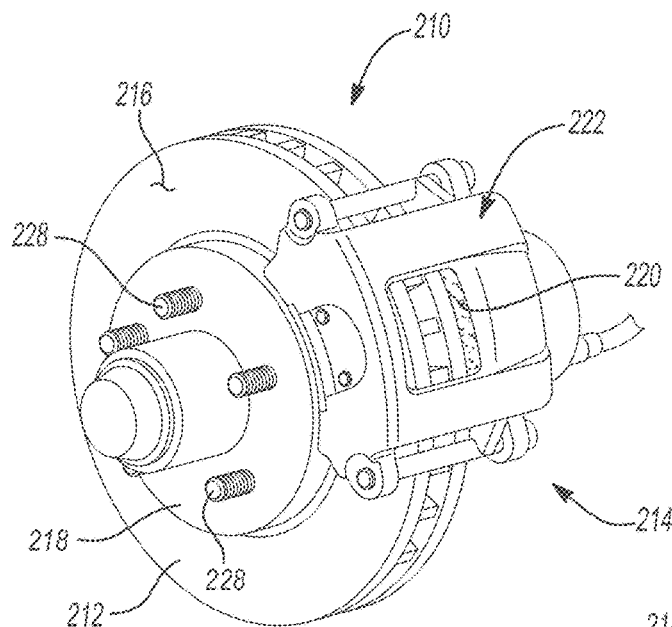
FIG. 6 is a perspective view of a vehicle brake assembly according to the principles of the present disclosure.

The method 100 of the present disclosure are relatively simple to execute and can be applied to manufacture many types of ferrous workpieces that have an axial symmetry that can be rotated during metal work, such as a rotational member of a vehicle brake assembly. Referring to FIG. 6, an exemplary vehicle brake assembly 210 is shown. The vehicle brake assembly 210 is an energy conversion system used to retard, stop, or hold a vehicle. While a vehicle in general may include spacecraft, aircraft, and ground vehicles, in this disclosure, a vehicle brake assembly 210 is used to retard, stop, or hold a wheeled vehicle with respect to the ground. More specifically, as disclosed herein, a brake 210 is configured to retard, stop, or hold at least one wheel of a wheeled vehicle. The vehicle brake assembly 210 may be a disc brake assembly 210 having a caliper 222 squeezing on a friction surface 216 of a brake rotor 212. In another example, the vehicle brake assembly 210 is a drum brake assembly (not shown) having friction brake pads (not shown) pushing out on a friction surface of the drum. In yet another example, the vehicle brake assembly 210 may also be a combination of a disc brake assembly or a drum brake assembly.

Still referring to FIG. 6, the brake rotor 212 includes a hub portion 218 and an annular disk portion 224 extending from the hub portion 218. The brake rotor 212 may be made from a ferrous alloy such as a cast iron alloy. The disk portion 224 includes a friction surface 216 that is engaged by a friction material of the brake pad 220 that is held in position by a caliper 222. Referring to FIGS. 7 through 10, the brake rotor 212 of FIG. 6 is shown independent of the remainder of the vehicle brake assembly 210. As in FIG. 6, the brake rotor 212 includes a disc portion 224 having a friction surface 216 and a hub portion 218. The hub portion 218 includes a plurality of bores or holes 226 through which pass the threaded studs 228 which are connected to the front axle or hub of the vehicle (not shown). The disc portion 224 includes the friction surface 216 upon which the friction or brake pads 220 of the vehicle brake assembly 210 act upon to stop the rotation of the wheel. Thus, the disc portion 224 and the hub portion 218 serve two different purposes; the disc portion 224 converts rotating energy into heat energy through friction and the hub portion retains the brake rotor 212 to the vehicle axle.

Figure 8:
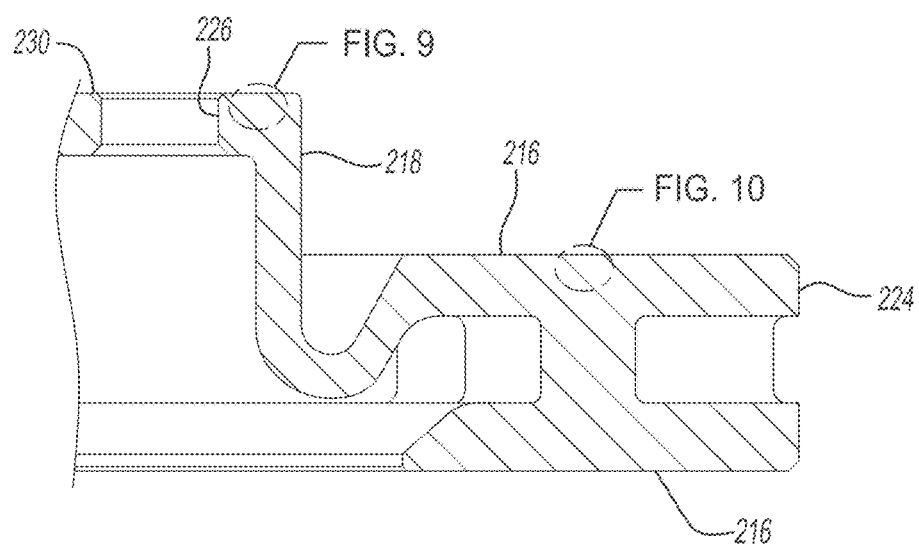
FIG. 8 is a partial cross-sectional view of the brake rotor of a vehicle brake assembly according to the principles of the present disclosure.

As illustrated in FIG. 8, the friction surface 216 of the disc portion 224 has required specifications for the purpose it serves. In particular, the friction surface 216 requires a hard, high wear and corrosion resistant surface capable of having a surface roughness of less than 3 μm. Since the friction surface 216 does wear due to the nature of this purpose, a thicker outside hardened layer, also referred to as a hardened casing, is ideal for a longer lasting brake rotor 212. The friction surfaced 216 may also include a hardened casing having multiple segments. The multiple segments may include varying thicknesses.

The surface 230 of the hub portion 218 does not require a hardened casing having the same thickness as the friction surface 216 of the disc portion 224. Therefore, the thickness of the FNC casing on the friction surface 216 of the disc portion 224 is approximately 1.1 to 2 times the thickness of the FNC casing of the surface 230 of the hub portion 218. This may be accomplished by nanocrystallization of the friction surface 216 of the disc portion 224 prior to exposing the entire brake rotor 212 to the FNC process. As noted above, nanocrystallization of at least a portion of the friction surface 216 is accomplished through the combination of machine turning and burnishing.

Figure 9:
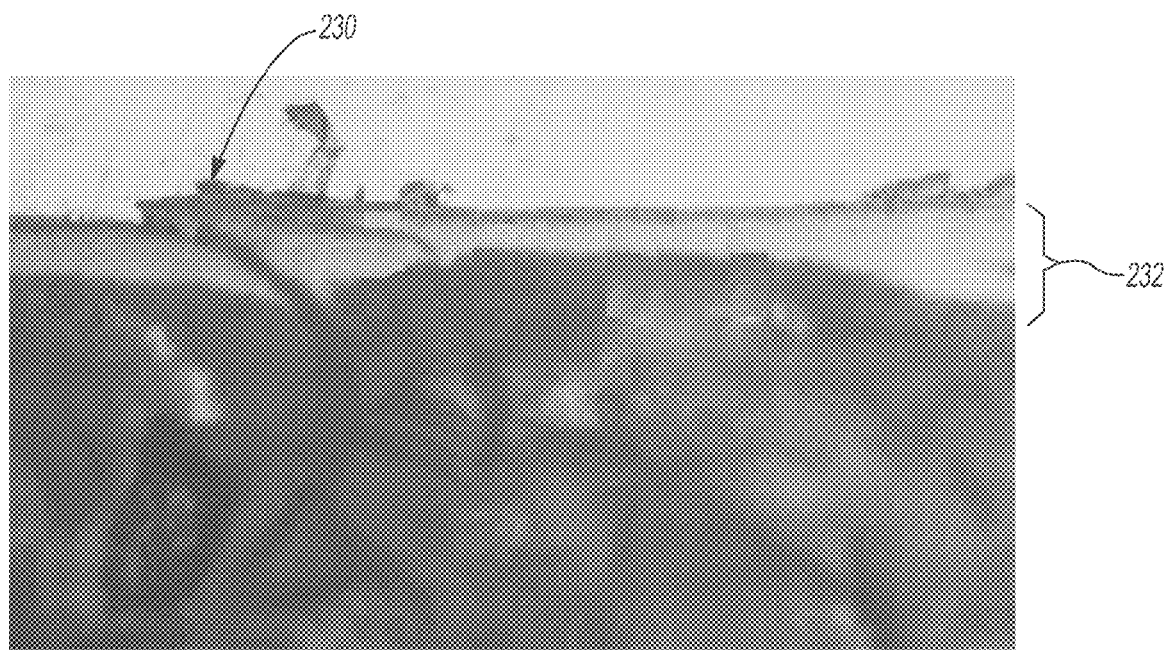
FIG. 9 is a micro-graph of a cross-section of the surface of a hub portion of brake rotor of a vehicle brake assembly according to the principles of the present disclosure.
Figure 10:
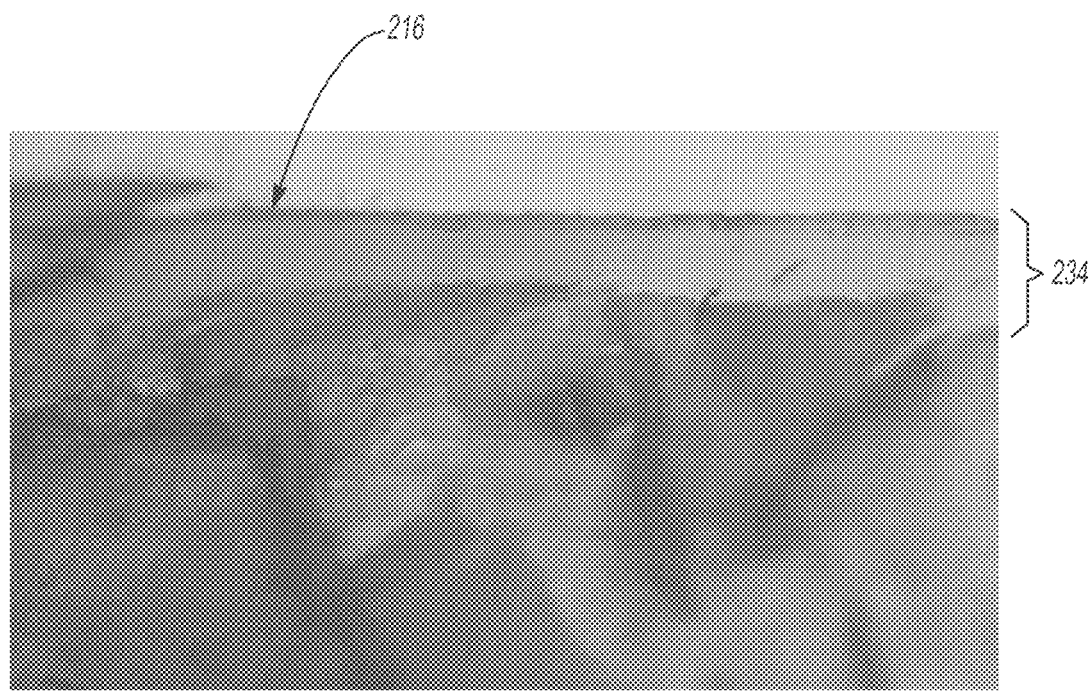
FIG. 10 is a micro-graph of a cross-section of the surface of a disk portion of brake rotor of a vehicle brake assembly according to the principles of the present disclosure.

FIG. 9 is micrograph image representing a cross-section of the surface 230 of the hub portion 218. FIG. 10 is a micrograph image representing a cross-section of the friction surface 216 of the disc portion 224 of the brake rotor. While the average thickness of the hardened casing 232 of the surface 230 of the hub portion averages approximately 8 μm, the average thickness of the hardened casing 232 of the friction surface 216 of the disc portion 224 is approximately 13 μm. The friction surface 216 may exhibit a hardness of about 90 HRC (Rockwell Hardness) and the hub may exhibit a hardness of about 50 HRC. Hardness is directly related to wear resistance, therefore the friction surface is more resistance to wear than the hub portion.

Figure 7:
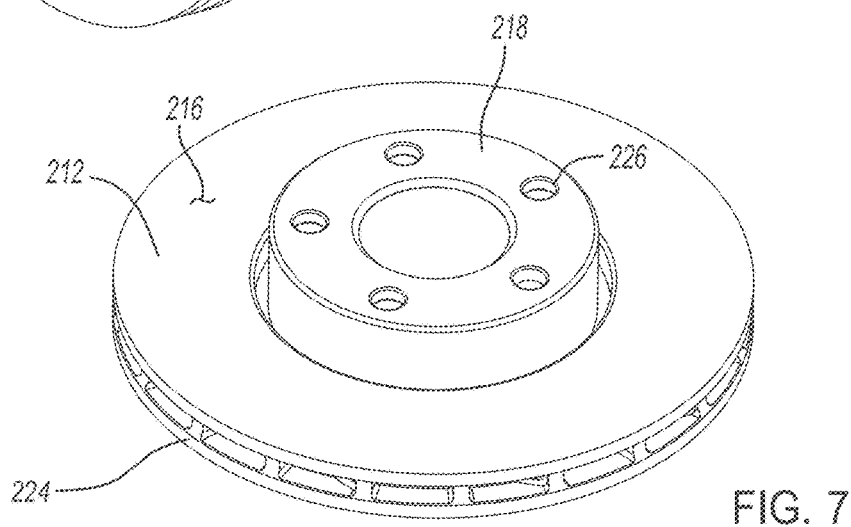
FIG. 7 is a perspective view of a brake rotor of a vehicle brake assembly according to the principles of the present disclosure.
Figure 11:
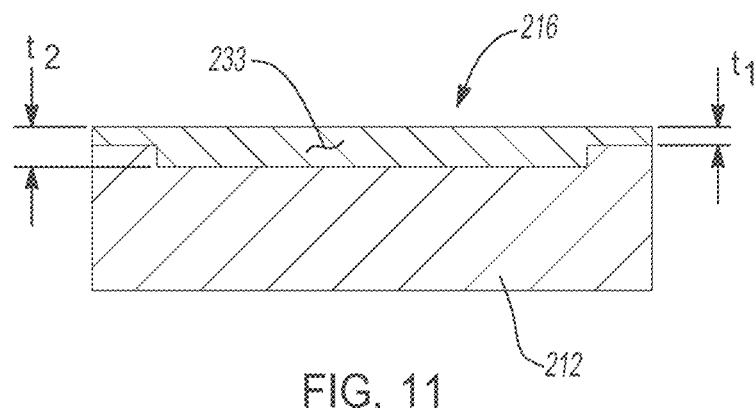
FIG. 11 is a partial cross-sectional view of the surface of a workpiece according to an exemplary embodiment.
Figure 12:
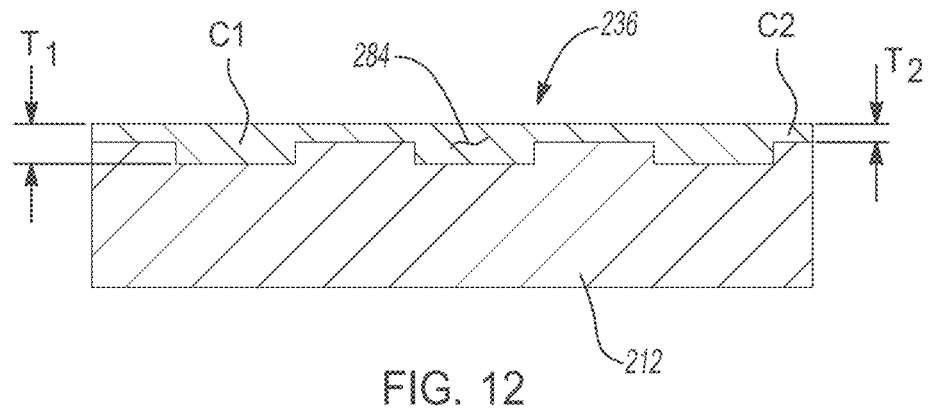
FIG. 12 is a partial cross-sectional view of the surface of a workpiece according to an exemplary embodiment.

With reference FIGS. 11 and 12 with continuing reference to FIG. 7, other examples of the present disclosure are presented and will now be described. FIG. 11 illustrates a partial cross-sectional view of the friction surface 216 of the brake rotor 212 as shown in FIG. 7. The friction surface 216 has a hardened casing 234 having thicknesses of t1 and t2. The different thicknesses are achieved through selectively nano-crystalizing the friction surface 216 by adjusting the cutting depth, high feeding rate, and rotational speed during the turning operation. The result of selective nano-crystalizing is that the subsequent FNC process will produce a deeper hardened casing on the portion of the surface that has undergone nanocrystallization by turning and burnishing than on a surface that was not. FIG. 12 illustrates a partial cross-sectional view of the friction surface 216 of the brake rotor 212 having multiple segments of a hardened casing 234 having thickness t2 with intervening segments of the hardened casing 234 having thickness t1. While only two examples of selective nanocrystallization are shown, many more patterns of variable hardened casing 134 thicknesses are considered without departing from the scope of this disclosure.

Figure 13:
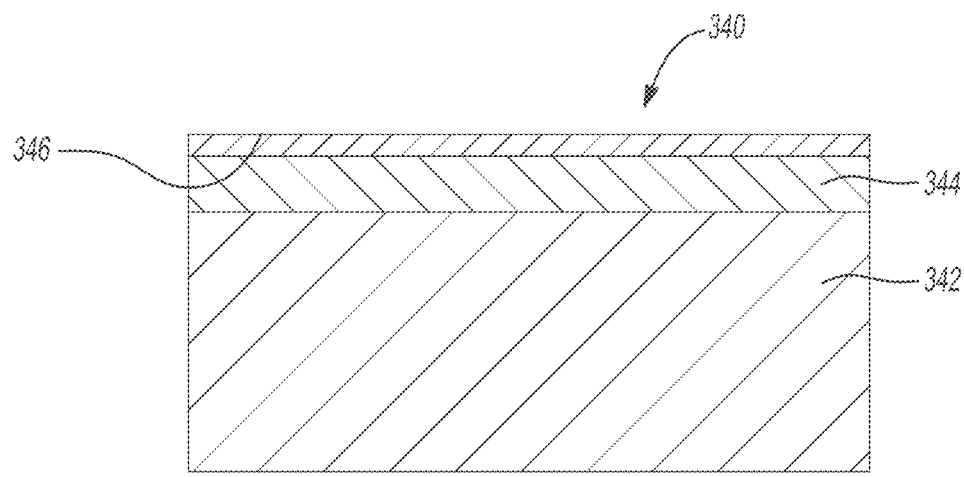
FIG. 13 is a partial cross-sectional view of the surface of a workpiece according to an exemplary embodiment.

Turning now to FIG. 13, another example of the present disclosure includes a workpiece 340 processed to include a ferrous or ferrous parent metal layer 342 having an untreated large crystal microstructure, a FNC hardened casing 344, and a porous FNC hardened casing 346. More specifically, the method 100 as disclosed above includes a FNC step in which a sufficiently higher concentration of nitrogen is included in the FNC atmosphere. During the high heat portion of the process, the additional nitrogen is soluble in the iron workpiece 340. However, as the workpiece 340 is cooled, the nitrogen is no long soluble in the iron in the concentration that it was when the iron was at the higher temperature. Therefore, the nitrogen comes out of solution in the form of surface porosity. In the present disclosure, the porous FNC hardened casing 346 has a depth greater than 10% of the depth of the FNC hardened casing 344.

The method 100 may be used to manufacture the brake rotor 212 where the friction surface of the brake rotor is turned at a sufficient feed rate and cut depth to provide a first deformed layer having a nanocrystallized microstructure on the first portion of the friction surface. The nanocrystallized microstructure layer may include multiple intervening segments having varying thicknesses formed by selectively varying the cutting depth and feed-rate. For example, the nanocrystallized microstructure layer on the surface may include a first segment having a first thickness, a second segment having a second thickness, a third segment having a third thickness, and so on and so forth.

The step of turning the first portion of the friction surface includes rotating the fiction surface about a rotational axis at a rate of 400 to 1000 revolution per minute (RPM), and removing a layer of material, with a cutting tool, from the first portion of the friction surface at a rate of 0.25 to 1.00 mm per revolution and a cutting depth of 0.2 to 0.8 mm to form a plurality of 3 to 8 micrometer deep grooves or a surface roughness (Ra) of 3 to 8 μm. The RPM of the friction surface about the rotational axis may be adjusted such that the linear speed of the friction surface relative to the cutting tool is 200 to 2000 meters per minute.

After turning there is an apparent peak and valley pattern on the surface which is suitable for burnishing since burnishing can facilitate the material flow from peak to valley to achieve good surface roughness. The process of burnishing within the parameters disclose herein further add to the relatively thicker layer of refined microstructures formed by the turning. The first portion of the friction surface is then burnished with a blunt tool to achieve a predetermined roughness of less than 3 μm. The method 100 may also include burnishing a second portion of the friction surface which was minimally turned, or fine turned, or non-machined at all to a roughness of less than 3 μm. The step of burnishing the first and second portions of the friction surface includes applying a burnishing pressure of 5 Mega-Pascal (MPa) to 25 MPa.

The brake rotor is then nitro-carburized at a time and temperature sufficient for the diffusion of nitrogen atoms and carbon atoms through the nanocrystallized microstructure layer to form a first hardened casing segment (c1) having thickness (t1) and a second hardened casing segment (c2) having a thickness (t2). The thickness (t1) of the first hardened casing segment (c1) is greater than the thickness (t2) of the second hardened casing segment (c2). Nitrocarburizing the rotational member includes diffusing a sufficient amount of nitrogen atoms and carbon atoms to form a third hardened casing on the hub surface, wherein the third hardened casing includes a third thickness less than the thickness (t2) of the second portion of the friction surface. It is to be understood that nitrocarburizing includes a gas nitrocarburizing process, a plasma nitrocarburizing process, or a salt bath nitrocarburizing process. The salt bath nitrocarburizing process may include immersing at least the friction surface 216 of the brake rotor 212 into a nitrocarburizing salt bath, and then immersing at least the friction surface 216 of the rotating member 212 into an oxidizing salt bath.

The combination of the turning process together with the burnishing process enables a thick nanocrystallization layer resulting in a thicker hardened casing after undergoing nitrocarburizing. Nitrocarburizing may be accomplished using accelerated diffusion of nitrogen and carbon atoms through the nanocrystallized surface layer. Surface nanocrystallization and nitro-carburization form a substantially rust-free and high wear/fatigue resistant surface on the ferrous components/workpieces.

Figure 14:
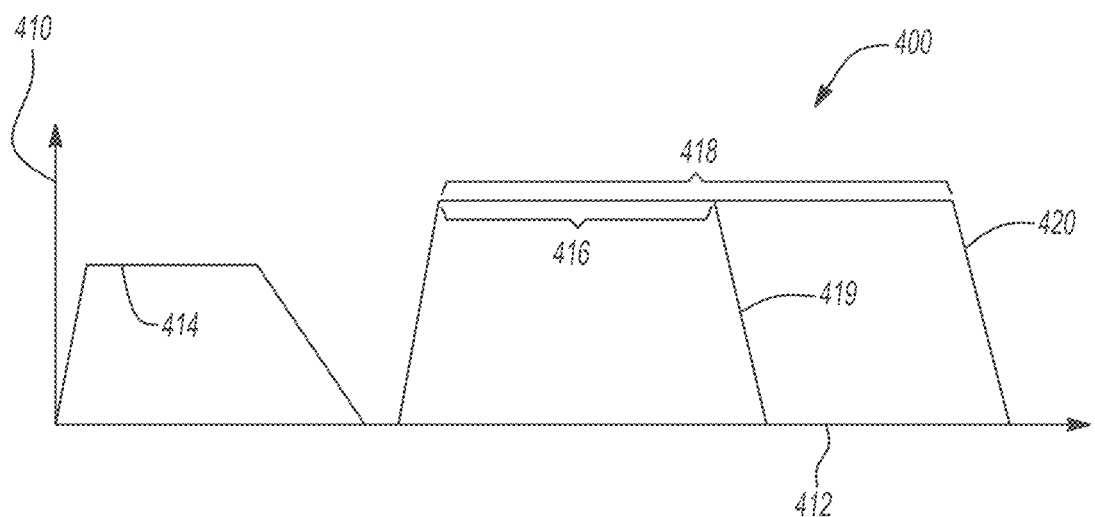
FIG. 14 is a time and temperature profile of a nitrocarburizing (FNC) treatment process.

A gaseous version of the ferritic nitro-carburizing (FNC) process takes about 5 to 6 hours at about 560° C. to about 570° C. to obtain a hard white layer penetrating from the surface to a depth of about 10 μm for metallic parts (for example, brake rotors) for better wear, fatigue and corrosion resistance. FIG. 14 depicts the FNC process 400 in a Time vs. Temperature graph in which the y-axis 410 represents temperature while the x-axis 412 represents time. The FNC process begins with a peroxidation process 414 during which the parts are heated to 450° C. for 90 minutes and air cooled. Next, the parts are heated to about 560° C. to about 570° C. for about 120 minutes at temperature 416. The parts are then oil cooled 419. The examples of the method 100 of the present disclosure advantageously reduce FNC time down to about 1 to 3 hours to achieve the same harden layer thickness and therefore considerably reduce the processing energy cost, as compared to heating at a time and temperature 418 and oil cooling 420 by not using method 100.

Numerical data have been presented herein in a range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a time period ranging from about 5 hours to about 10 hours should be interpreted to include not only the explicitly recited limits of about 5 hours to about 10 hours, but also to include individual amounts such as 5.5 hours, 7 hours, 8.25 hours, etc., and sub-ranges such as 8 hours to 9 hours, etc. Furthermore, when "about" or "approximately" is utilized to describe a value, this is meant to encompass minor variations (up to +/−10%) from the stated value.

While examples have been described in detail, those familiar with the art to which this disclosure relates will recognize various alternative designs and examples for practicing the disclosed method within the scope of the appended claims.

What is claimed is:

1. A method for manufacturing a ferrous rotational member having a friction surface, the method comprising:
   turning a first portion of the friction surface at a sufficient feed rate and a sufficient cutting depth to provide a first deformed layer on the first portion of the friction surface, wherein the first deformed layer comprises a first portion nanocrystallized microstructure;
   burnishing the first portion of the friction surface, after the turning, with a blunt tool to thicken the first portion nanocrystallized microstructure and to achieve a predetermined roughness; and
   nitrocarburizing the rotational member at a time and temperature sufficient for a diffusion of nitrogen atoms and carbon atoms through the thicken first portion nanocrystallized microstructure layer to form a hardened casing (c1) having thickness (t1);
   wherein the step of turning the first portion of the friction surface includes:
   rotating the friction surface about a rotational axis at a rate of 400 to 1000 revolution per minute (RPM), and
   removing a layer of material, with a cutting tool, from the first portion of the friction surface at a feed rate of 0.25 to 1.00 mm per revolution and a cutting depth of 0.2 to 0.8 mm.

2. The method of claim 1, wherein the step of turning the first portion of the friction surface includes generating a surface roughness (Ra) of 3 to 8 μm.

3. The method of claim 2, wherein burnishing the first portion of the friction surface, after the turning, with a blunt tool achieves a roughness (Ra) of less than 3 μm.

4. The method of claim 3, further including the step of sufficiently burnishing a second portion of the friction surface to obtain a roughness of less than 3 μm and to form a second portion nanocrystallized microstructure layer;
   wherein the step of nitrocarburizing the rotational member includes diffusing a sufficient amount of nitrogen atoms and carbon atoms through the second portion nanocrystallized microstructure layer of the second portion of the friction surface to form a hardened casing (c2) having thickness (t2).

5. The method of claim 4, wherein the thickness (t1) of the hardened casing (c1) is greater than the thickness (t2) of the hardened casing (c2).

6. The method of claim 5, wherein burnishing the first and second portions of the friction surface includes applying a burnishing pressure of 5 Mega-Pascal (MPa) to 25 MPa.

7. The method of claim 5, wherein the rotational member is a brake rotor having a hub surface, and the step of nitrocarburizing the rotational member includes diffusing a sufficient amount of nitrogen atoms and carbon atoms to form a third hardened casing on the hub surface, wherein the third hardened casing includes a third thickness less than the thickness (t2) of the second portion of the friction surface.

8. The method of claim 1, wherein the step of turning the first portion of the friction surface includes cutting a plurality of 3 to 8 micrometer deep grooves.

9. The method of claim 1, wherein the step of machining the friction surface of the rotational member further includes:
adjusting the RPM of the friction surface about the rotational axis such that a linear speed of the friction surface relative to the cutting tool is 200 to 2000 meters per minute.

10. A method for manufacturing a ferrous member having a friction surface, the method comprising:
turning a first portion of the friction surface at a sufficient feed rate and cutting depth to provide a first deformed layer on the first portion of the friction surface, wherein the first deformed layer comprises a nanocrystallized microstructure layer;
burnishing the first portion of the friction surface to achieve a predetermined first roughness; and
nitrocarburizing the ferrous member at a time and temperature sufficient for a diffusion of nitrogen atoms and carbon atoms through the nanocrystallized microstructure layer;
wherein turning the first portion of the friction surface includes rotating the ferrous member about a rotational axis at a rate of 400 to 1000 revolution per minute (RPM) and removing a layer of material from the surface of the first portion of the friction surface, with a cutting tool, at a feed rate of 0.25 to 1.00 mm per revolution and a cut-depth of 0.2 to 0.8 mm.

11. The method of claim 10, further comprising the steps of:
fine turning a second portion of the friction surface at a sufficient feed rate to provide a second deformed layer on the second portion of the friction surface, wherein the second deformed layer comprises a nanocrystallized microstructure layer thinner than the nanocrystallized microstructure layer of the first portion of the friction surface; and
burnishing the second portion of the friction surface to achieve a predetermined second roughness;
wherein burnishing the first portion and the second portion of the friction surface includes applying a burnishing pressure of 5 Mega-Pascal (MPa) to 25 MPa.

* * * * *